United States Patent
Mügge et al.

(10) Patent No.: US 10,421,392 B2
(45) Date of Patent: Sep. 24, 2019

(54) LIGHTING APPARATUS FOR VEHICLES

(71) Applicant: Hella KGaA Hueck & Co., Lippstadt (DE)

(72) Inventors: Martin Mügge, Geseke (DE); Thomas Rettweiler, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 15/549,781

(22) PCT Filed: Feb. 9, 2016

(86) PCT No.: PCT/EP2016/052701
§ 371 (c)(1),
(2) Date: Aug. 9, 2017

(87) PCT Pub. No.: WO2016/131673
PCT Pub. Date: Aug. 25, 2016

(65) Prior Publication Data
US 2018/0022269 A1    Jan. 25, 2018

(30) Foreign Application Priority Data
Feb. 17, 2015   (DE) .................. 10 2015 102 243

(51) Int. Cl.
*B60Q 1/26*   (2006.01)
*F21S 43/13*  (2018.01)
(Continued)

(52) U.S. Cl.
CPC ......... *B60Q 1/2607* (2013.01); *B60Q 1/0041* (2013.01); *B60Q 1/2696* (2013.01);
(Continued)

(58) Field of Classification Search
CPC ..... B60Q 1/0041; B60Q 1/2607; F21S 43/20; F21S 43/26; F21S 43/235; G03H 1/0248
See application file for complete search history.

(56) References Cited

U.S. PATENT DOCUMENTS 5,455,747 A * 10/1995 Aoyama .............. B60Q 1/2607
                                                    362/545
5,571,277 A * 11/1996 Allred .................... B60Q 1/302
                                                    340/479
(Continued)

FOREIGN PATENT DOCUMENTS

DE           1421306 C2    12/1999
DE      102004046408 A1    3/2006
(Continued)

*Primary Examiner* — Julie A Bannan
(74) *Attorney, Agent, or Firm* — Husch Blackwell LLP

(57) ABSTRACT

A lighting apparatus for vehicles with a light source unit and optical equipment for generating a specified signal light distribution to provide a specified signal function. The optical equipment consists of at least two optical units. A first optical unit deflects a first light beam emitted by the first light source is designed to generate the specified signal light distribution. A second optical unit, a hologram element, is used to deflect a second light beam generated by the second light source to create a holographic light image so that the specified signal function consists of the signal light distribution and the holographic light image that is spaced at a distance.

8 Claims, 7 Drawing Sheets

(51) Int. Cl.
  *F21S 43/237* (2018.01)
  *F21S 43/20* (2018.01)
  *F21S 43/247* (2018.01)
  *F21S 43/243* (2018.01)
  *F21S 43/14* (2018.01)
  *B60Q 1/00* (2006.01)
  *B60Q 1/38* (2006.01)
  *B60Q 1/30* (2006.01)
  *B60Q 1/34* (2006.01)
  *B60Q 1/44* (2006.01)
  *F21Y 115/10* (2016.01)
  *G03H 1/02* (2006.01)
  *G03H 1/22* (2006.01)

(52) U.S. Cl.
  CPC .............. *B60Q 1/30* (2013.01); *B60Q 1/34* (2013.01); *B60Q 1/38* (2013.01); *B60Q 1/44* (2013.01); *F21S 43/13* (2018.01); *F21S 43/14* (2018.01); *F21S 43/20* (2018.01); *F21S 43/237* (2018.01); *F21S 43/243* (2018.01); *F21S 43/247* (2018.01); *F21S 43/26* (2018.01); *B60Q 2400/30* (2013.01); *B60Q 2400/50* (2013.01); *F21Y 2115/10* (2016.08); *G03H 1/0248* (2013.01); *G03H 1/2202* (2013.01)

(56) References Cited

U.S. PATENT DOCUMENTS

| | | | |
|---|---|---|---|
| 8,506,144 B2* | 8/2013 | Wang | B60Q 1/2696 362/520 |
| 2010/0302794 A1 | 12/2010 | Oomen et al. | |
| 2013/0128583 A1* | 5/2013 | Hikmet | G02B 5/0221 362/259 |

FOREIGN PATENT DOCUMENTS

| | | |
|---|---|---|
| DE | 102012103368 A1 | 10/2013 |
| DE | 102014204535 A1 | 10/2015 |
| JP | 09039653 A | 2/1997 |
| JP | 10083707 A | 3/1998 |

* cited by examiner

LIGHTING APPARATUS FOR VEHICLES

CROSS REFERENCE

This application claims priority to PCT Patent Application No. PCT/EP2016/052701, filed 9 Feb. 2016, which itself claims priority to German Application No. 10 2015 102243.5, filed 17 Feb. 2015, the entirety of both of which are hereby incorporated by reference.

FIELD OF THE INVENTION

The invention of a vehicle lighting apparatus with a light source unit and an optical unit for generating a specified signal light distribution to provide the specified signal function.

BACKGROUND OF THE INVENTION

DE 44 21 306 C2 specifies a vehicle lighting apparatus that functions as a signal light unit and features a light source and a hologram element for the light source. The hologram element is attached to a cover lens. The hologram element features a structure that causes the light beam emitted from the light source to bend according to a specified light distribution parameter. This can, for example, generate the required light distribution for a direction indicator. The known lighting apparatus is limited to supplying the light distribution and signal functions required by law from just the light source and the hologram element installed in a small area.

SUMMARY OF THE INVENTION

The purpose of this invention is to make further developments to a vehicle lighting apparatus to improve road users' ability to perceive the light function, which helps improve road traffic safety.

To achieve this aim, a first optical unit for deflecting a first light beam emitted by the first light source of the light source unit is designed to generate the specified signal light distribution and where a second optical unit, a hologram element, which is used to deflect a second light beam generated by the second light source of the light source unit is designed to create a holographic light image so that the specified signal function consists of the signal light distribution and the holographic light image that is spaced at a distance.

According to the invention, a holographic light image is added to a signal light distribution generated by a light source and a first optical unit. Preferably, the holographic light image is generated by an additional light source and a hologram element as a second optical unit. The holographic light image functions as an additional light image that enhances the signal distribution stipulated by law for generating the signal function. The basic principle of the invention is to design and arrange a hologram element such that the ability to detect the signal function is improved due to the physical distance between the signal light distribution and the holographic light image. According to the invention, this creates an enlarged perceptible light area of the light function, particularly in the vicinity of the cover lens, and creates an additional illuminated area.

According to an embodiment of the invention, a signal light unit is included that consists of a first light source and a first optical unit for generating the specified light distribution. A hologram unit is also provided that consists of a second light source and the hologram unit as a second optical unit and is used to generate the holographic light image. An advantage is that the signal light unit and hologram light unit can be activated independently of each other. The hologram light unit is added to the conventional signal light unit to generate the additional holographic light image of the signal function. The hologram unit holder must be taken into account when making changes.

In an advanced embodiment of the invention, the structure of the hologram element is designed such that the holographic light image is arranged in the vicinity of a cover lens that is enclosed in a housing for the lighting apparatus. An illuminated area of the signal light unit, which extends to the cover lens, can be expanded through the holographic light image in front of and/or behind the cover lens so that illuminated sections, areas or strips are created. This improves the ability to perceive the signal light function.

If, in an advanced embodiment of the invention, the holographic light image is generated outside the housing, this can improve the visibility of the signal light function.

According to a an updated version of the invention, the hologram element is attached to the inside of the cover lens or to a support disc on the inside of the housing. The advantage is that a compact hologram assembly is provided that is space-saving and can be installed in the housing of the lighting apparatus.

According to an embodiment of the invention, the hologram unit is designed as a volume hologram unit that can be used to bend the second light beam within a defined angle and/or spectral range. Preferably, the volume hologram element is designed as a film in which two-dimensional photopolymers are integrated. The advantage is that the film can be glued or welded to the support disc or be attached or laminated onto it using ultrasonic welding.

In an advanced embodiment of the invention, the hologram element is designed as a reflection hologram element and installed in a lower section of the housing. The hologram element emits the second light beam up at a steep angle of radiation, and a holographic light image extends into a lower section of the housing. The advantage is that this allows the hologram unit to be attached to a housing wall to save space. When installed this way, the hologram light unit also improves visibility from above.

In an advanced embodiment of the invention, the hologram element is designed as a diffractive lens or a surface hologram that is attached to film or is included in the production process for the cover lens or an additional lens.

In an advanced embodiment of the invention, the holographic light image runs mostly perpendicular to the cover lens and/or horizontally. The advantage is that this creates space as only the signature of the signal function on the cover lens can be used as another illuminated area. This expands the physical illuminated area in front of and/or behind the cover lens.

In an advanced embodiment of the invention, the hologram element is segmented, where hologram segments can be illuminated individually or sequentially by the second light source. The advantage of this is that multiple hologram segments can be activated separately from each other such that multiple light strips or light areas of the holographic light image can be generated in sequence to provide support in signaling the direction of travel. The light strips/light areas are generated by assigned and illuminated hologram segments. The advantage is that this can increase awareness of a direction indicator light function by using a "sequential direction indicator" method.

BRIEF DESCRIPTION OF THE DRAWINGS

Reference is now made more particularly to the drawings, which illustrate the best presently known mode of carrying

DETAILED DESCRIPTION OF THE DRAWINGS

Figure 1:
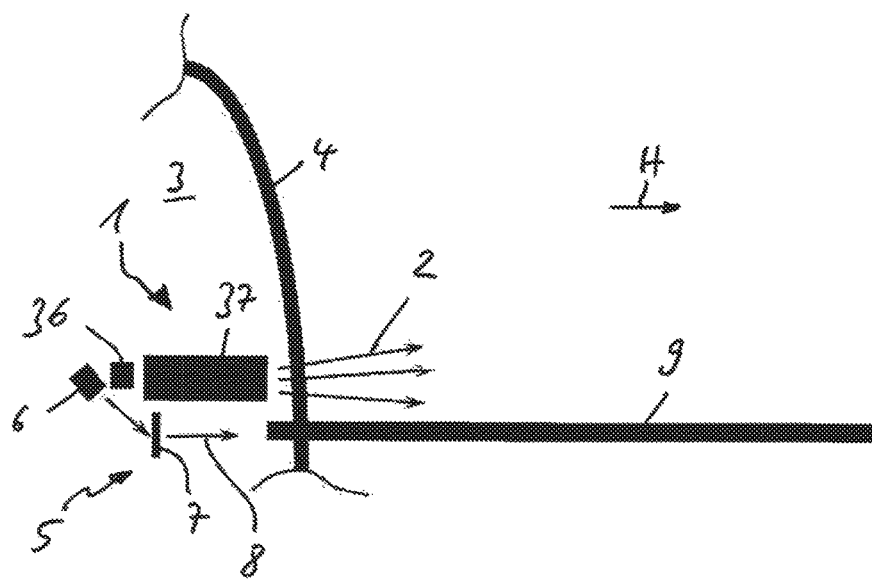
FIG. 1 is a schematic side view of a lighting apparatus with a signal light unit and a hologram light unit in which a holographic light image intersects a cover lens of a light housing.

An inventive lighting apparatus is used to generate signal functions, such as direction indicator, taillight, position light, brake light and daytime driving light functions. This enables a three-dimensional expansion of the light from the conventional light function.

According to a first embodiment of a lighting apparatus (shown in FIG. 1), a signal light unit (1) is provided as the first light unit for generating a specified signal light distribution for functions such as the direction indicator function. For this purpose, the signal light unit (1) features a light source (36), such as an LED light source, and a first optical unit (37) for deflecting the first light beam emitted from the first light source. For the purpose of simplification, in FIG. 1 the first optical unit (37), which can be designed as a reflector or a light guide, is depicted as a block from which a first light beam (2) for generating the signal light distribution is emitted out through a cover lens (4) that is enclosed by a housing (3) of the lighting apparatus.

In addition, the second light unit of the lighting apparatus is a hologram light unit (5) that mostly consists of a second light source (6) and a hologram unit (7). The second light source (6) can consist of one or more LED light sources or laser diodes. The hologram light unit (5) is used to generate a holographic light image (9) that expands the signal light distribution and also enhances the signal function.

The first light source (36) of the signal light unit (1) and the second light source (6) of the hologram light unit (5) form a light source unit. The light beam (2) is emitted from the first light source (36) to the first optical unit (37) and a second light beam (8) is emitted from the second light source (6) to the hologram element (7).

In this embodiment, the first light source (36) of the signal light unit (1) and the second light source (6) of the hologram light unit (5) are mainly arranged on a single horizontal plane. The hologram element (7) of the hologram light unit (5) is installed below the signal light unit (1).

The hologram element (7) is designed as a holographic optical element (HOE) that is classified as a diffractive optical element. In comparison to conventional refractive optical elements, diffractive optical elements have much smaller optical structures that bend the light within a limited spectral range. Diffractive optical elements can be designed as a lattice, lens or mirror beam splitter, or some combination of these.

The hologram element (7) is designed as a volume hologram element in the form of emulsion or holographic film. Preferably, the hologram element is designed as a photopolymer in the form of film. The volume hologram element is designed as a relatively thick hologram because its lattice constant l is always smaller than the thickness of the film material. The product calculated from the thickness t of the hologram and the wavelength λ used is significantly larger than the square of the lattice constant l, see $\lambda \times t \gg l^2$. As the lattice constant l is relatively small (within the range of the light wavelength λ at its highest), the lattice structure is almost invisible to the human eye. For this reason, the hologram element (7) appears transparent.

The hologram element (7) designed as film can be preformed through deep drawing, placed in an injection mold and then sprayed with a cover lens material. Alternatively, the hologram element film (7) can also be glued or welded to a surface at a later stage (through ultrasonic welding, for example).

The hologram element (7) can be designed as a diffractive lens or a surface hologram that is attached to film or included in the production process for the cover lens or an additional lens.

At the hologram element (7), the second light beam (8) is bent within a defined, limited angle and spectral range. The light guidance structures (lattice structures) integrated in the holographic recording medium are almost invisible to observers.

The hologram element (7) features a structure in which a holographic light image (9) is formed in the vicinity of the cover lens (4). In this embodiment example in FIG. 1, the holographic light image (9) mainly extends horizontally in areas in front of and behind the cover lens (4). The holographic light image (9) forms an illuminated area that mostly runs perpendicular to the cover lens 4 and horizontally.

According to another embodiment of the invention (not pictured), the holographic light image (9) in FIG. 1 can only be arranged outside of the housing (3).

Figure 2:
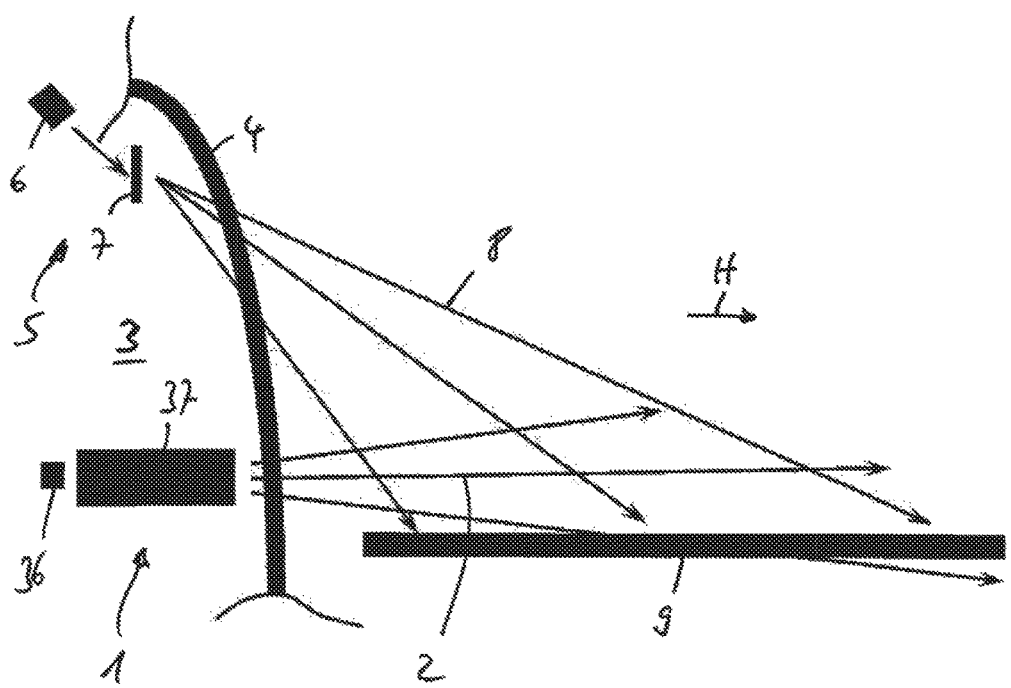
FIG. 2 is a schematic side view of a second embodiment of the lighting unit in which a hologram element is installed in an upper section of the housing and the holographic light image is arranged outside the cover lens.

According to another embodiment of the invention (shown in FIG. 2), the hologram light unit (5) is not in the lower section of the housing (3)—like the embodiment in FIG. 1—but instead in an upper section of the housing (3). As such, the diffusion plane of the second light beam (8) formed by the hologram light unit (5) is not in a horizontal plane, but rather an oblique area.

The same components and/or component functions in the embodiment examples have been given the same reference numbers.

Figure 3:
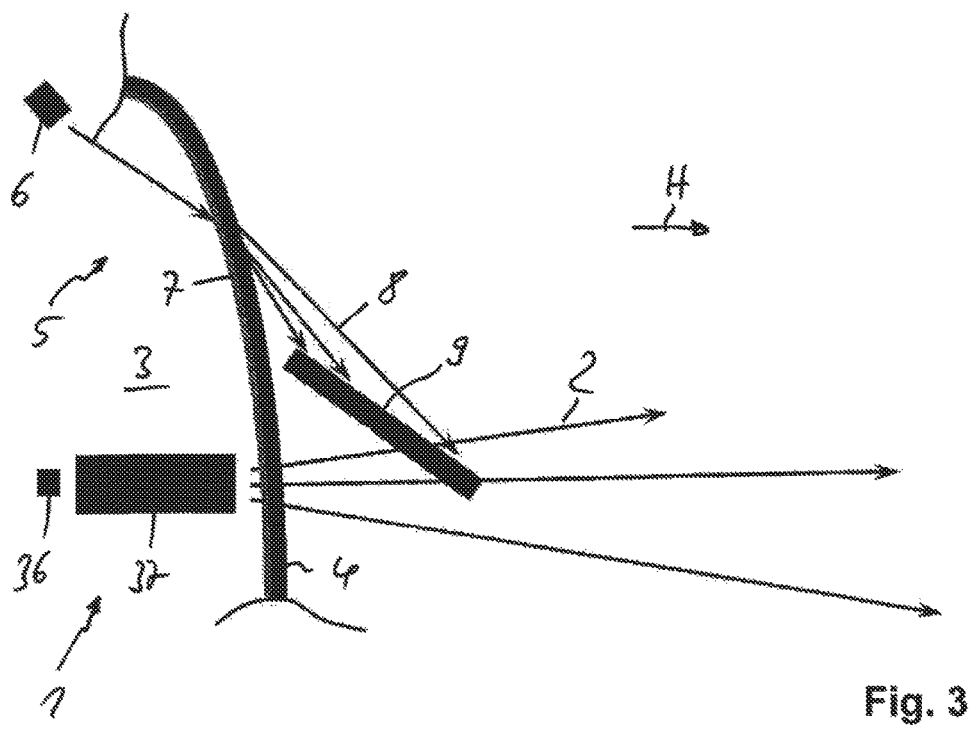
FIG. 3 is a schematic side view of the lighting apparatus in which the hologram element is attached to the inside of the cover lens and the holographic light image is arranged outside the light housing at an oblique angle.

According to another embodiment of the invention (shown in FIG. 3), the hologram element (7) is attached to the inside of the cover lens (4) (unlike the aforementioned embodiment examples). Preferably, the hologram element (7) is attached to film that has a self-adhesive surface. Due to the fact that the hologram element (7) is attached to the cover lens (4), the holographic light image (9) can be set at an oblique angle and can be viewed from the front and sides at relatively flat angles.

At the hologram element (7), the second light beam (8) is bent within a defined, limited angle and spectral range. This makes the light guidance structures (lattice structures) integrated in the holographic recording medium almost invisible to observers. The advantage is that the hologram element (7) does not feature any visible optical structures.

Figure 4:
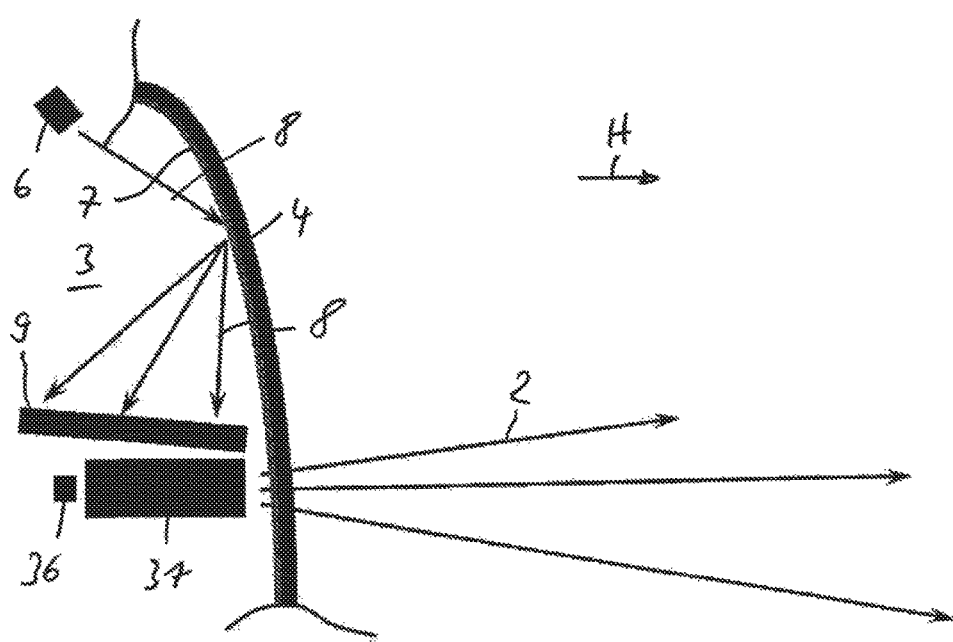
FIG. 4 is a schematic side view of a lighting apparatus, according to another embodiment, in which the hologram element is used to reflect a light beam and the holographic light structure is installed above the first light unit.

According to an embodiment of the invention that is not pictured, the holographic light image (9) shown in FIG. 4 can only be arranged outside of the housing (3). In this embodiment, the hologram element (7) is designed as a reflection hologram element that features a hologram structure. This structure reflects the light beam (8) emitted from the second light source (6) to the holographic light image (9) that extends above the signal light unit (1) in the housing (3).

Figure 5:
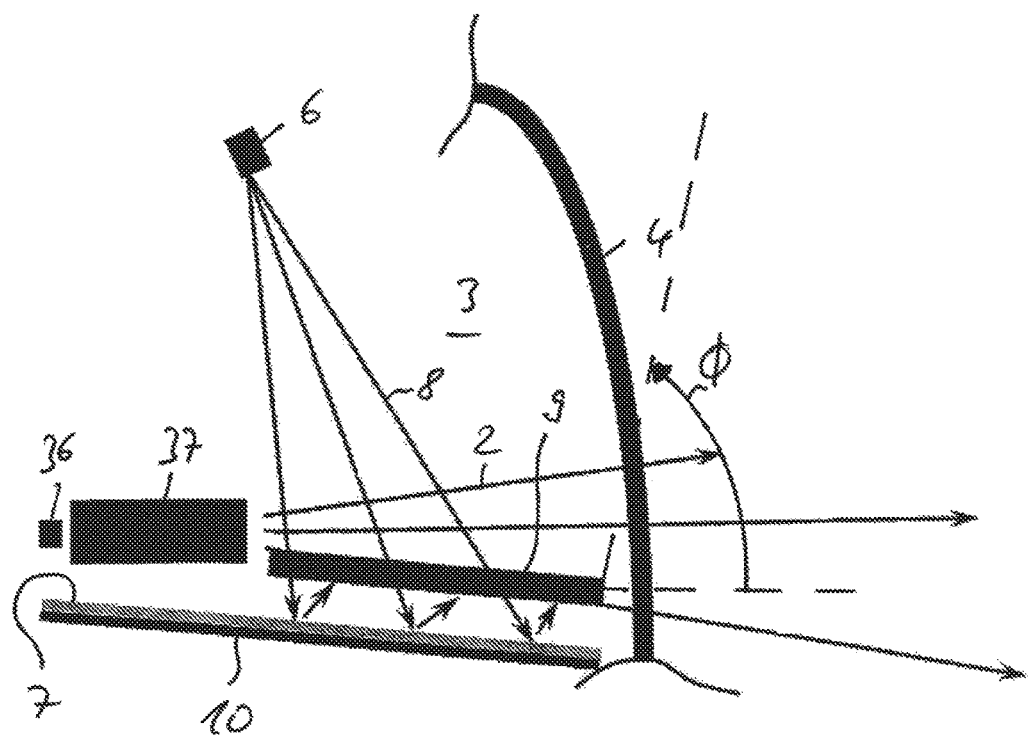
FIG. 5 is another embodiment of the invention in which the hologram element is used to reflect the second light beam and the holographic light image is installed in front of the first light unit in the main direction of the beam.

According to another embodiment of the invention (shown in FIG. 5), the hologram element (7) is attached to the inside of a lower wall (10) of the housing (3). The hologram structure of this hologram element (7) is designed such that the holographic light image (9) is also within a lower section of the housing (3). The advantage is that the the holographic light image (9) can be seen from above at a relatively large illumination angle Φ.

According to another embodiment of the invention (shown in FIG. 6) the holographic light image (9) can be segmented by light strips (11, 11', 11") or light bars that are parallel to each other.

Figure 6:
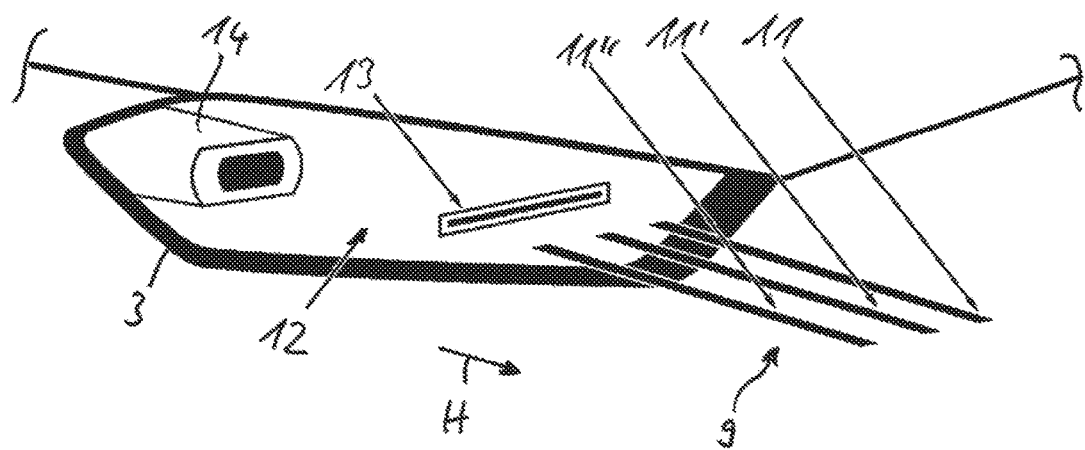
FIG. 6 is a schematic front view of a lighting apparatus with a holographic light image that consists of light bars facing the main direction of the beam.

A schematic diagram of the housing (3) with a signal light unit (12) is shown in FIG. 6. It features a linear light signature (13) for generating light for a direction indicator. For example, the signal light unit (12) features a linear light guide. Light is coupled into this device, and it is decoupled by decoupling elements on a side facing the cover lens (4). The light strips (11) extend in the main direction of the beam H for the lighting apparatus and form a single plane with the light signature (13) (e.g. a horizontal plane).

To generate the light strips, a hologram element (not pictured) is segmented and consists of several hologram elements. (in this embodiment example, three hologram segments) that correspond to the light strips 11, 11', 11". The hologram segments can be activated/illuminated individually using a second light source assigned to these segments. Alternatively, a single second light source can be assigned to the hologram segments, and an aperture device can be provided to activate/illuminate the individual hologram segments.

The hologram segments can be activated in sequence from the inside to the outside (relative to a center axis of the vehicle) to enhance the "direction indicator" signal function. This activates/illuminates a first light bar (11), second light bar (11') and third light bar 11" sequentially. This means that the direction indicator function can be enabled using a "sequential direction indicator" method that includes a hologram.

In addition, the housing (3) includes an additional light unit (14) that can be used to distribute low beam and high beam light.

Figure 7:
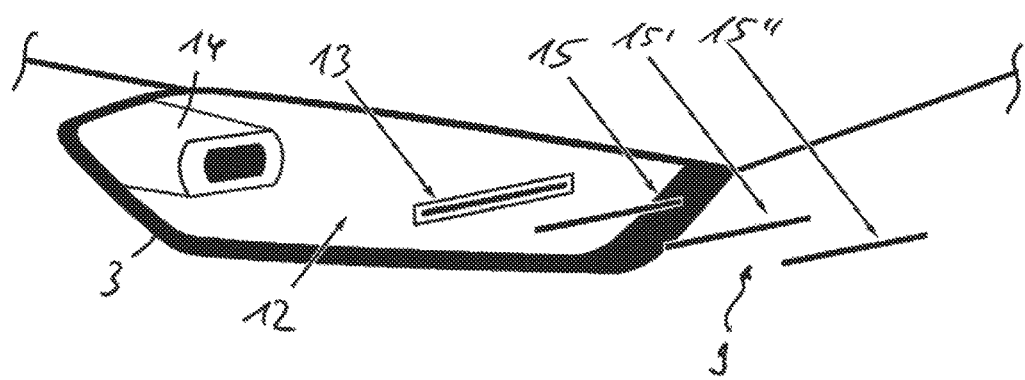
FIG. 7 is a schematic front view of a lighting apparatus with a holographic light image that is arranged in a direction perpendicular to the light bars facing in the main direction of the beam. These light bars are arranged at a distance from one another.

According to another embodiment of the invention (shown in FIG. 7), light strips that run perpendicular to the main direction of the beam H and spaced apart from each other (15, 15', 15") can be used in place of light strips that run in the main direction of the beam H (11, 11', 11"). These light strips form a single plane with the light signature (13) of the signal light unit (12).

Figure 8:
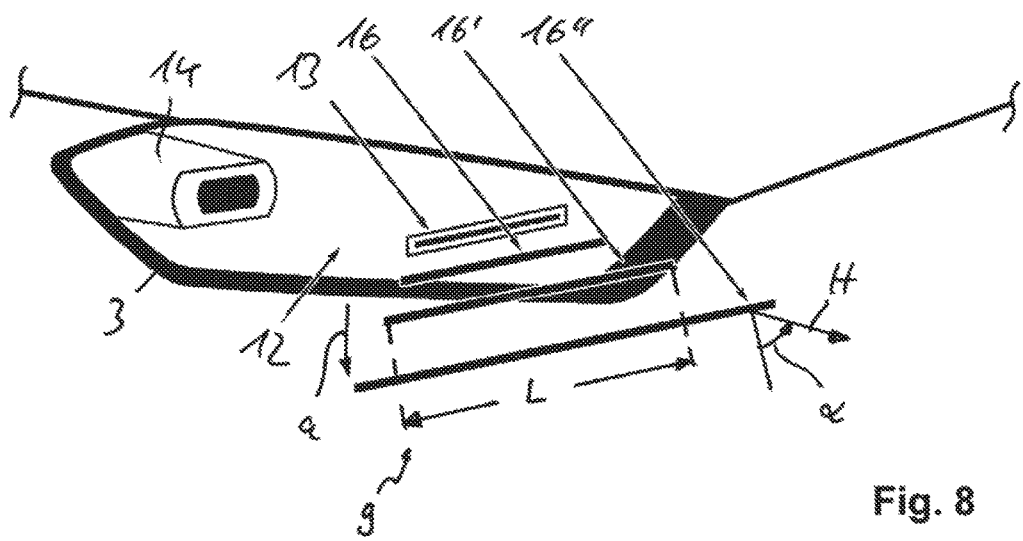
FIG. 8 is a schematic front view of a lighting apparatus with a holographic light image that features light bars that are spaced parallel to each other and perpendicular to the main direction of the beam and light bars that extend further in the main direction of the beam.

According to another embodiment of the invention (shown in FIG. 8), a row of light strips (16, 16', 16") can be formed that are parallel to and spaced from one another at an angle α to the main direction of the beam H, where the length L of the the light strips (16, 16', 16") is greater as their distance a is from the cover lens (4) increases. In this embodiment example, the row of light strips (16, 16', 16") extends out at a 45° angle to the main direction of the beam (H). This oblique alignment of the hologram light strips (16, 16', 16") improves the display of the direction indicator function.

Figure 9:
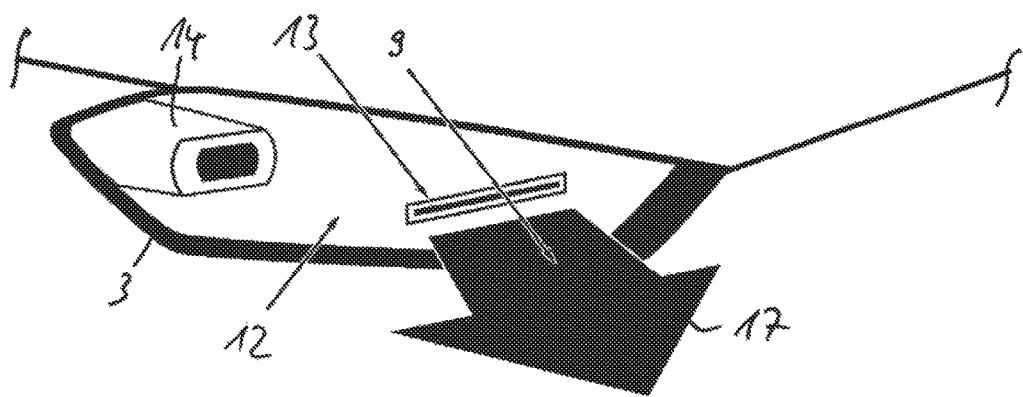
FIG. 9 is another embodiment of the invention in which the holographic light image is an arrow-shaped area.

According to another embodiment of the invention (shown in FIG. 9), the holographic light image (9) can also be designed as an arrow-shaped area (17).

According to another embodiment of the invention (not pictured), the hologram light unit can feature a light guide (ideally arranged horizontally) to generate light for the direction indicator function. Light is coupled into the end of this device. The holographic light image (9) is situated in the main direction of the beam H on the light guide and in front of the lighting apparatus. It can feature light strips that are perpendicular or parallel to the main direction of the beam H and that are arranged in a single plane (e.g. tilting horizontally). For example, the light bars can also be arranged in an arrow shape as they taper in the main direction of the beam H.

Alternatively, the holographic light image (9) can also be used to create a logo, such as a symbol. Alternatively, the holographic light image (9) can also be designed as a three-dimensional image or as light distribution.

Figure 10:
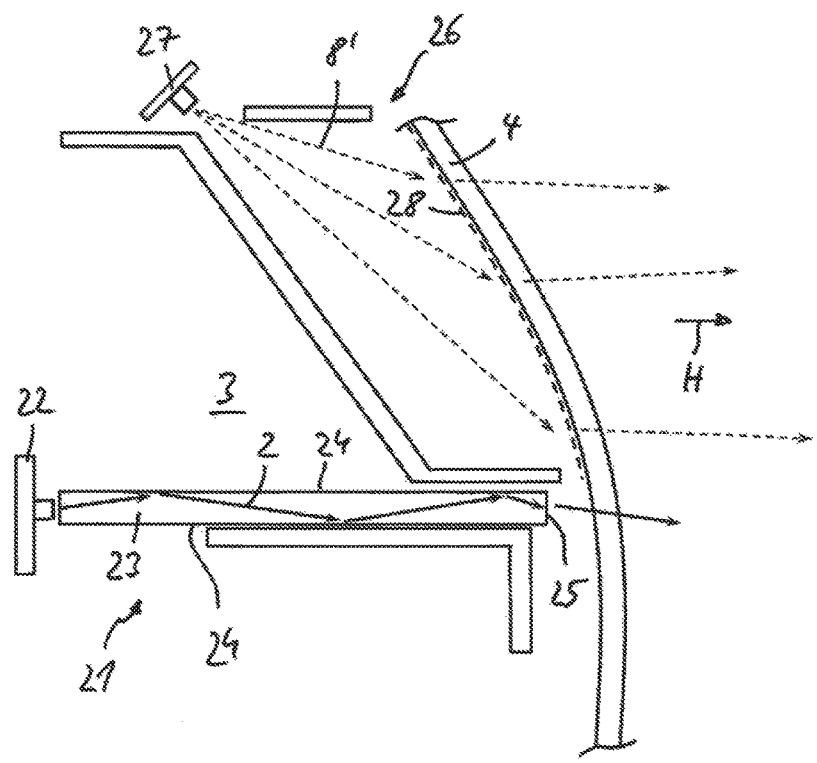
FIG. 10 is a schematic side view of a lighting apparatus, according to another embodiment, in which the hologram light unit is arranged at a distance from the signal unit and where the hologram element runs on the inside of the cover lens.

According to another embodiment of the invention (shown in FIG. 10), a signal light unit (21) is installed in a lower section of the housing (3), and it features a first light source (22) and a light guide plate (23) placed in front of this light source in the main direction of the beam H. The light guide plate (23) is a first optical unit. The first light beam (2) emitted from the first light source (22) is coupled into the narrow side of the light guide plate (23), totally reflected at flat sides (24) across from the light guide plate (23) and is then decoupled at the light decoupling surface (25) across from the light coupling surface to generate light for a direction indicator.

A hologram light unit (26) is arranged vertically above the signal light unit (21). This hologram light unit features a second light source (27) and a hologram unit (28) installed inside the cover lens (4). The hologram element (28) functions as a second optical unit for deflecting a second light beam (8') emitted from the second light source (27). Then, the holographic light image (9) (not pictured) is generated outside of the housing (3) to create a three-dimensional light effect that magnifies the light function generated by the signal light unit (21). This can improve the visibility/perceptibility of the signal light function and increase traffic safety.

According to an alternative embodiment of the invention (shown in FIG. 11), the hologram element (28) can also be attached to a vertical, transparent lens (29) that is located in the light housing (3).

Figure 11:
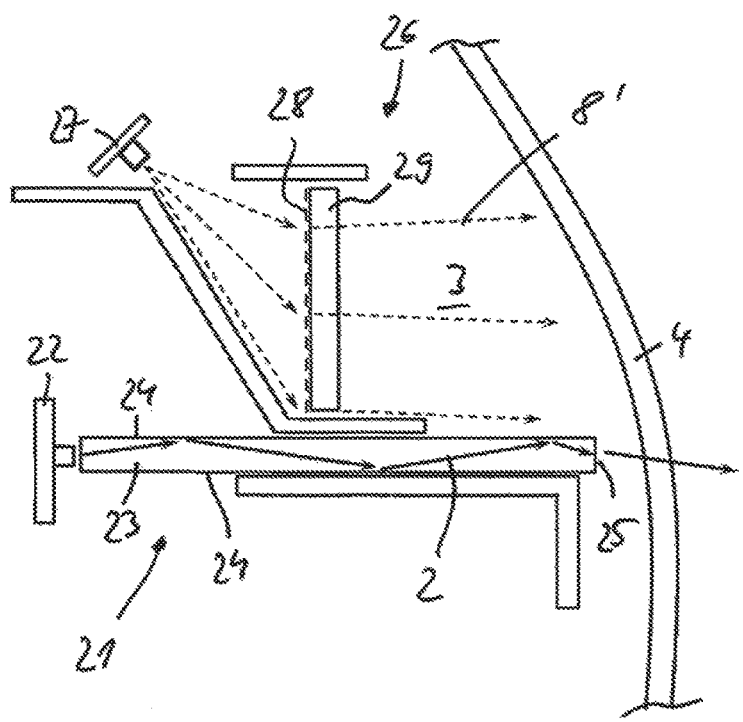
FIG. 11 is a schematic side view of a lighting apparatus, according to another embodiment, in which the hologram element is attached to a base plate inside the housing.
Figure 12:
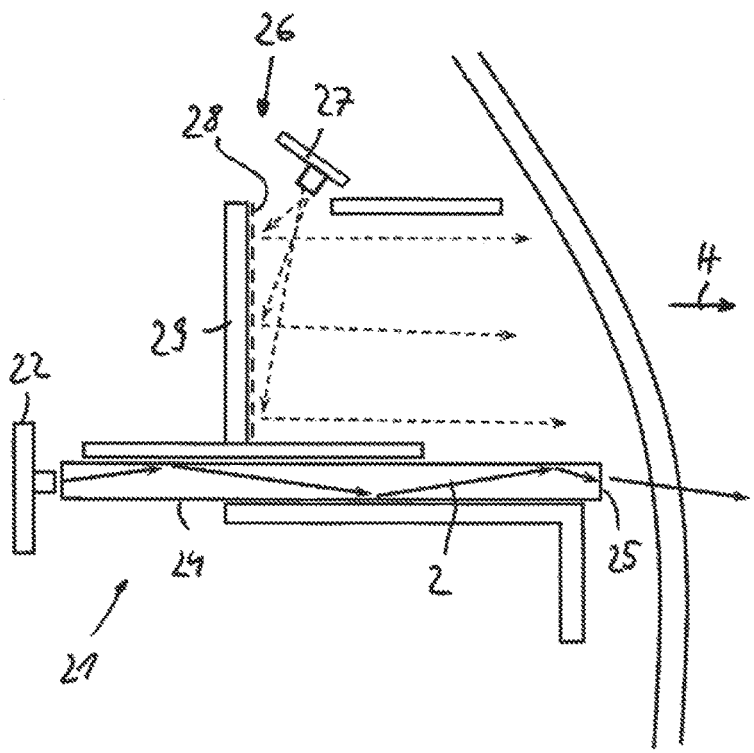
FIG. 12 is another embodiment of the inventive lighting apparatus in which the hologram element is arranged behind the second light source in the main direction of the beam and is used to reflect the second light beam.

Unlike the embodiment in FIG. 11, according to another embodiment shown in FIG. 12, the lens (29) can also be installed behind the second light source (27) in the main direction of the beam H, where it is used to reflect the second light beam (8'). This allows for a relatively flat and tall light housing (3) design.

Figure 13:
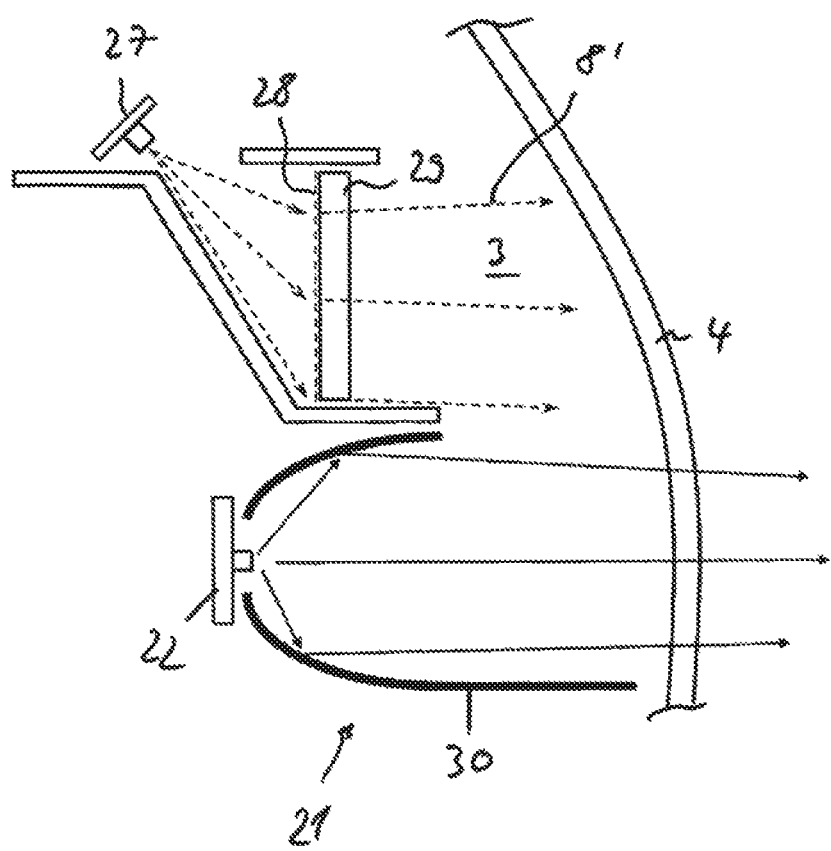
FIG. 13 is another embodiment of the lighting apparatus where, unlike the embodiment in FIG. 11, the first light unit features a reflector as the optical unit instead of a light guide.

Unlike the embodiment in FIG. 11, according to another embodiment in FIG. 13, the signal light unit (21) can also consist of the first light source (22) and a reflector (30) to generate the desired signal light function. As such, this invention combines conventional signal light function generation and an enlargement of the light areas for these functions in the vicinity of the cover lens (4) using the hologram light unit (5 or 26).

As illustrated in FIG. 6, the hologram element (7) is segmented into light strips (11). Each light strip (11, 11', 11") is a hologram segment that can be activated/deactivated individually or sequentially by supplying it with light. This process can be used to to activate second light sources accordingly or to guide light to the hologram elements (11) using an aperture control system.

According to an embodiment of the invention that is not pictured, the hologram light unit (5, 26) can also be used to expand the range of other signal functions, such as those for taillights, position lights, brake lights and daytime running lights.

LIST OF REFERENCE SYMBOLS

1 Signal light unit
2 1st light beam
3 Housing
4 Cover lens
5 Hologram light unit
6 2nd light source
7 Hologram element
8.8' 2nd light beam
9 Holographic light image
10 Lower housing wall
11.11',11" Light strip
12 Signal light unit
13 Light signature
14 Additional light unit
15 Light strip
16.16',16" Arrow-shaped surface
17
21 Signal light unit
22 1st light source
23 Light guide plate
24 Flat side
25 Light decoupling surface
26 Hologram element
27 2nd light source
28 Hologram element
29 Cover lens
30 Reflector
36 1st light source
37 1st optical unit
a Spacing
g Lattice constant
d Thickness
H Main direction of beam
L Length

The invention claimed is:

1. A lighting apparatus for vehicles, the light source comprising: a light source unit including at least a first and a second light source; and optical equipment for generating a specified signal light distribution to provide a specified signal function, said optical equipment including: at least two optical units, where: a first non-holographic optical unit for deflecting a first light beam emitted by the first light source generates a specified non-holographic signal light distribution and a second optical unit, which includes a hologram element, deflects a second light beam generated by the second light source to create a holographic light image; wherein the specified signal function consists of the signal light distribution and the holographic light image spaced at a distance therefrom; wherein the hologram element features a structure in which the holographic light image is arranged in the vicinity of a cover lens that is enclosed in a housing for the lighting apparatus and the holographic light image runs mostly perpendicular to the cover lens.

2. The lighting apparatus in accordance with claim 1, wherein the light source unit consists of the first light source from the first optical unit and the second light source from the second optical unit, so that a signal light unit consisting of the first light source and the first optical unit is designed to generate the signal light distribution and a hologram lighting unit consisting of the second light source and the second optical unit is designed to generate the holographic light image.

3. The lighting apparatus in accordance with claim 1, wherein the holographic light image is located within at least one of the housing, the area of entry for the cover lens, and outside the housing.

4. The lighting apparatus in accordance with claim 1, wherein the hologram element is attached to the inside of the cover lens or to a support disc on the inside of the housing.

5. The lighting apparatus in accordance with claim 1, wherein the hologram element is designed as a volume hologram element, a surface hologram element or a diffractive lens that is used to bend the second light beam within at least one of an angle and spectral range defined for this beam.

6. The lighting apparatus in accordance with claim 1, wherein the hologram element is designed as a reflection hologram element and is located in a lower section of the housing so that the hologram element can emit the second light beam up through the cover lens at a steep angle of radiation ($\Phi$), where the holographic light image is located in a lower section of the housing.

7. The lighting apparatus in accordance with claim 1, wherein the hologram element is segmented, where hologram segments of the hologram element are at least one of activated individually and sequentially using multiple light sources.

8. The lighting apparatus in accordance with claim 1, wherein the hologram element is designed such that the holographic light image features light strips, light areas or three-dimensional images.

* * * * *